US009684741B2

(12) United States Patent
Li et al.

(10) Patent No.: US 9,684,741 B2
(45) Date of Patent: Jun. 20, 2017

(54) PRESENTING SEARCH RESULTS ACCORDING TO QUERY DOMAINS

(75) Inventors: Xiao Li, Bellevue, WA (US); Patrick Nguyen, Kirkland, WA (US); Geoffrey Zweig, Sammamish, WA (US); Alejandro Acero, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1218 days.

(21) Appl. No.: 12/479,371

(22) Filed: Jun. 5, 2009

(65) Prior Publication Data

US 2010/0312782 A1 Dec. 9, 2010

(51) Int. Cl.
  *G06F 17/30* (2006.01)
  *G10L 15/26* (2006.01)
  *G06N 99/00* (2010.01)

(52) U.S. Cl.
  CPC ..... *G06F 17/30991* (2013.01); *G06N 99/005* (2013.01); *G10L 15/26* (2013.01)

(58) Field of Classification Search
  None
  See application file for complete search history.

(56) References Cited

U.S. PATENT DOCUMENTS

| 6,615,172 | B1 | 9/2003 | Bennett et al. |
| 6,757,718 | B1 | 6/2004 | Halverson et al. |
| 6,839,669 | B1 * | 1/2005 | Gould et al. ................. 704/246 |
| 6,973,429 | B2 | 12/2005 | Smith |
| 7,031,907 | B1 | 4/2006 | Passaretti et al. |
| 7,477,909 | B2 | 1/2009 | Roth |
| 2004/0093321 | A1 * | 5/2004 | Roustant et al. ................. 707/3 |
| 2005/0027694 | A1 * | 2/2005 | Sauermann ....... G06F 17/30554 |
| 2007/0061146 | A1 | 3/2007 | Jaramillo et al. |
| 2007/0185839 | A1 * | 8/2007 | Shah et al. ........................ 707/3 |
| 2007/0288439 | A1 * | 12/2007 | Rappaport et al. ............... 707/3 |
| 2007/0294240 | A1 | 12/2007 | Steele et al. |
| 2008/0104037 | A1 | 5/2008 | Bierner |
| 2008/0215557 | A1 * | 9/2008 | Ramer et al. ..................... 707/4 |
| 2008/0228496 | A1 | 9/2008 | Yu et al. |

(Continued)

OTHER PUBLICATIONS

"Google to Power iPhone Voice Search", 2009, http://infotech.indiatimes.com/articleshow/3716195.cms.

*Primary Examiner* — Tyler Torgrimson
(74) *Attorney, Agent, or Firm* — Cooper Legal Group

(57) ABSTRACT

A query may be applied against search engines that respectively return a set of search results relating to various items discovered in the searched data sets. However, presenting numerous and varied search results may be difficult on mobile devices with small displays and limited computational resources. Instead, search results may be associated with search domains representing various information types (e.g., contacts, public figures, places, projects, movies, music, and books) and presented by grouping search results with associated query domains, e.g., in a tabbed user interface. The query may be received through an input device associated with a particular input domain, and may be transitioned to the query domain of a particular search engine (e.g., by recognizing phonemes of a voice query using an acoustic model; matching phonemes with query terms according to a pronunciation model; and generating a recognition result according to a vocabulary of an n-gram language model.)

17 Claims, 11 Drawing Sheets

(56) References Cited

U.S. PATENT DOCUMENTS

2008/0243777 A1* 10/2008 Stewart et al. .................. 707/3
2008/0256033 A1   10/2008 Cheng
2009/0240672 A1*  9/2009 Costello ......................... 707/4
2009/0254527 A1* 10/2009 Jung et al. ...................... 707/3

* cited by examiner

PRESENTING SEARCH RESULTS ACCORDING TO QUERY DOMAINS

BACKGROUND

In many fields of computing, a search query may be executed against one or more search engines, and a set of search results may be returned and presented to the user. Respective search engines may cover different data sets that may in turn include one or more types of data; e.g., a local file search engine might search for files in a filesystem, a contacts search engine might search a contacts database, and a web search engine might search a set of web pages, each comprising one or more types of data. The search results are then presented to the user, e.g., as a list of hyperlinks to web pages identified by the web search engine, and as a list of icons representing files identified by the local file search engine. The search results are often organized by predicted relevance; e.g., a predicted relevance score might be calculated for respective search results based on factors such as the general popularity of respective web search results and the creation date of the locally stored files, and the search results may be presented as a list in descending order according to the predicted relevance scores.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As a result of the expanding scope and types of available data sets that may be searched and the search engines applied thereto, the presentation of search results has become more complicated. A search query for a particular term may return search results covering many subjects, and it may be difficult for a user to identify search results related to the topics intended by the user. As a first example, if the search results are compiled into a list or set and presented together, many different topics might be presented in the search results that are at least partially associated with various terms of the search query, and that are potentially relevant. As an alternative technique, the search may be executed on multiple search engines, such as a local file search engine and a web search engine, and the search results of different search engines might be presented separately. However, this separation is based on the data set that is accessible to any particular search engine, and not necessarily on commonalities among the search results. Thus, the separation might separate two search results regarding the same subject that are identified by different search engines, while conflating many types of disparate search results that are identified by one search engine. Moreover, the list of such results may be extensive and verbose, and it may be difficult to browse these results on some devices, such as mobile devices with comparatively small displays.

An alternative technique for handling and presenting search results involves identifying a query domain with which each search result is related. For example, a set of query domains may be defined, such as public individuals, contact information, locations, movies, and locally stored documents. A set of search results that are obtained in response to a search query may be associated with these query domains, and may be grouped together by query domain for presentation to the user. Moreover, the set of search results may be presented as a set of query domains, each comprising the set of search results that are associated with the query domain. For example, the user may be presented with a tabbed user interface comprising a series of tabs, each representing (and labeled to identify) a particular query domain and the search results associated with each query domain may be presented on the respective tab. In this manner, the search results may be organized in a more efficient manner and presented to the user in a semantically related manner that may be more easily reviewed by the user. This presentation of search results may also be more consolidated, which may be advantageous on devices with limited displays, such as mobile devices.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
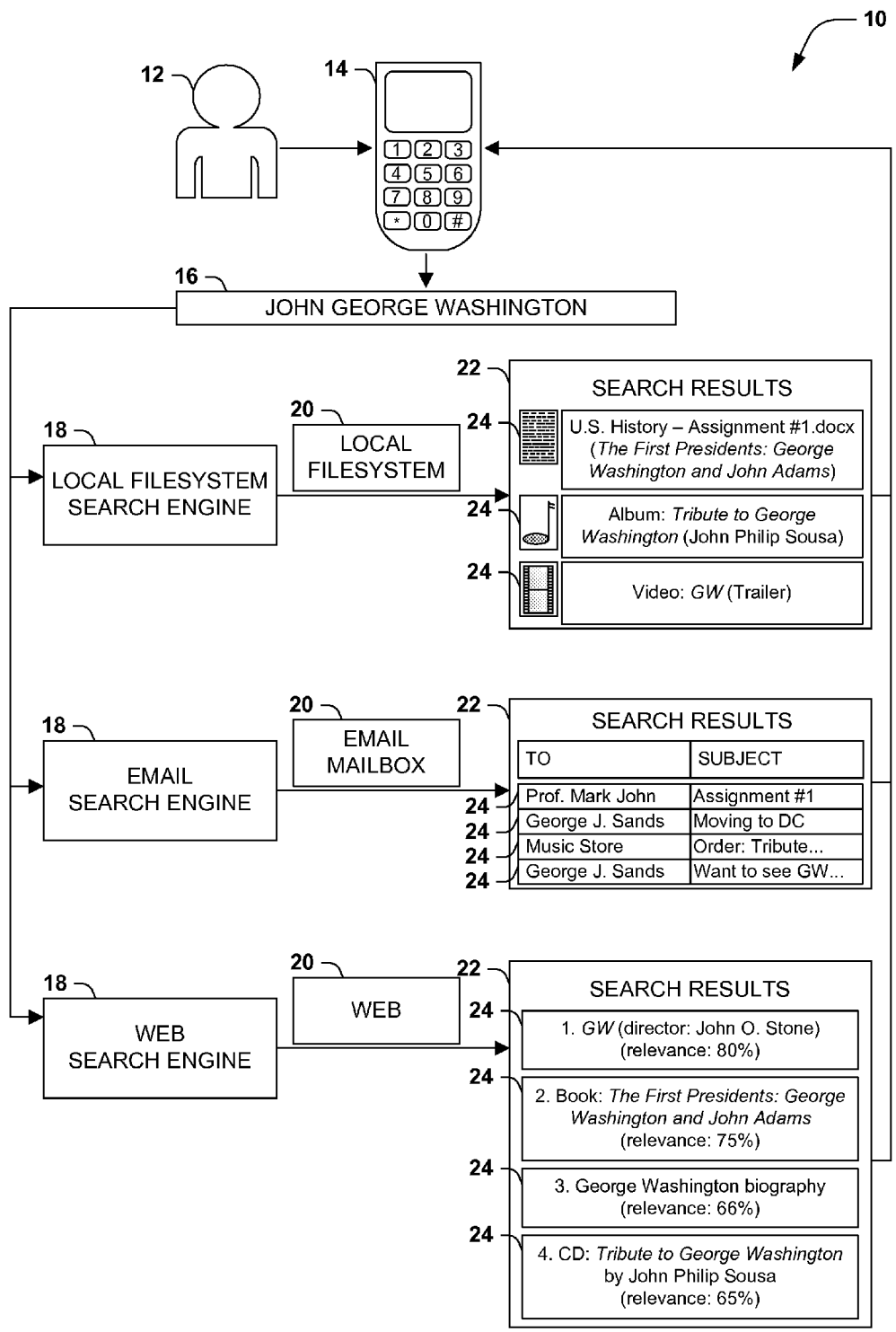
FIG. 1 is an illustration of an exemplary scenario involving a query producing a set of search results through a set of search engines.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Within the contemporary field of computing, many types of search engines have been provided that permit the application of search queries to broad and diverse forms of data, including web pages accessible over a network such as the internet; various records and objects stored in databases; files stored in filesystems; and individuals represented in contact directories. Many scenarios may therefore involve the submission of search queries to a search engine, and the presentation of search results provided by the search engine. These search queries may be formulated in many ways (e.g., as a descriptor of the items sought; as a field-based search with Boolean connectors; or as a natural language query), and may be submitted to multiple search engines that each return a set of search results.

FIG. 1 presents an exemplary scenario 10 involving a query 16 on behalf of a user 12 of a device 14. The query 16 involves a few words ("John George Washington"), which may have been entered by the user 12 in several ways (e.g., text input via a keyboard or touchpad device, macro selection of individual query terms, or speech input into a microphone.) The query 16 may be fulfilled by the device 14 by execution on several search engines 18, each configured to search a particular data set 20 for items matching the query 16, such as a local filesystem search engine configured to search a local filesystem, an email search engine configured to search an email mailbox of the user 12, and a web search engine configured to search the web.

Each search engine may return a search result set 22, comprising a set of search results 24 located in the data set 20 and matching the query 16 (according to the domain-specific matching rules of the search engine 18.) As a first example, the local filesystem search engine might identify three files in the local filesystem matching the query: a document entitled "U.S. History—Assignment #1.docx" that covers a book about George Washington and John Adams; a media object comprising a musical album entitled Tribute to George Washington by John Philip Sousa; and a media object representing a video trailer for a movie about George Washington entitled GW, directed by John O. Stone. As a second example, the email search engine may examine the email mailbox and find several email messages satisfying the search query: a first email message sent to Professor Mark John at George Mason University, and with the "Assignment #1" document attached; two email messages sent to an individual named George Jonathan Sands, the first message indicating a possible move to Washington, D.C., and the second message regarding the GW movie; and an email to a music store regarding an order of the Tribute to George Washington album. Finally, the web search engine may identify four web pages on various websites that satisfy the query 16: the first, a synopsis of the GW movie; the second, a description of the book about George Washington and John Adams; the third, a biography about George Washington; and the fourth, an order page by the music store for the Tribute to George Washington album. Moreover, the web search engine may also provide an indication of the potential relevance of each search result 24 to the query 16. These search results 24, each at least marginally satisfying the query 16, may be generated by each search engine 18 and provided to the device 14 for presentation to the user 12.

The search results may be presented to the user in many ways. As a first example, the search results may be rendered as a web page and presented within a web browser. As a second example, the search query may be submitted to multiple search engines, and the search results returned by each search engine may be presented within a separate user interface, or may otherwise be grouped according to the search engine that returned the results. As a third example, the search results returned by the search engines may be evaluated for relevance, and may be presented to the user in an order that reflects the predicted intentions of the individual and the likely preferences of the individual among the search results. As a fourth example, the search results may be organized and presented according to the data sources relating thereto (e.g., a first set of search results may represent files stored in a first filesystem; a second set of search results may represent files stored in a second filesystem; and a third and fourth sets of search results may represent web pages retrieved, respectively, from a first website and a second website.)

Figure 2:
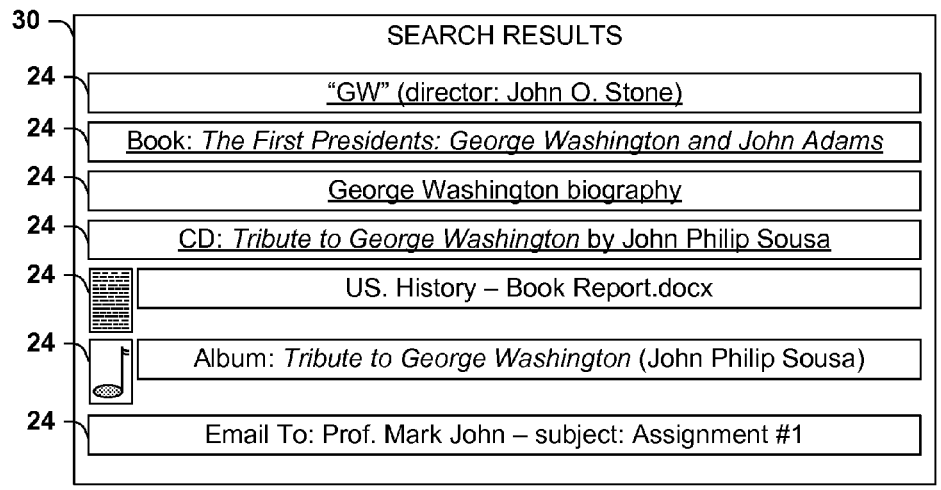
FIG. 2 is an illustration of two presentations of the search results of FIG. 1.
Figure 2:
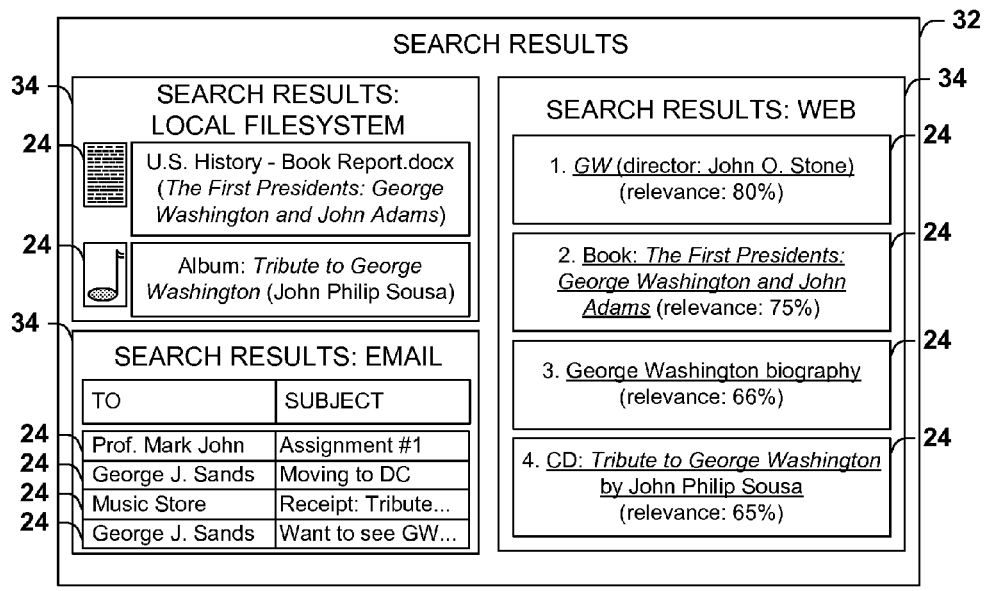

FIG. 2 presents two exemplary presentations of the search results 24 generated by the respective search engines 18 in response to the query 16 in the exemplary scenario 10 of FIG. 1. In the first presentation 30 of FIG. 2, the search results 24 generated by the search engines 18 may simply be aggregated and presented as a single list of search results 24. The entries may be sorted in various ways (e.g., alphabetically, or by relevance scores (where the relevance scores provided by each search engine 18 may be normalized.) Each entry in the first presentation 30 may include a caption that briefly describes the search result 24, and may also be selected or activated by the user 12 to view more information about the search result 24. For example, selecting a search result 24 provided by the web search engine may open a web browser that is directed toward the corresponding web page; selecting a search result 24 provided by the email search engine may display the corresponding email; and selecting a search result 24 provided by the local filesystem search engine may present the corresponding file in an associated viewer (e.g., the document may be displayed in a document authoring application, while the media objects may be rendered by corresponding media player applications.) This first presentation 30 of search results 24 may be presented on a display of the device 14 in a list or table, e.g., as a list of search results 24 presented as a web page within a web browser executing on the device 14.

FIG. 2 also illustrates a second presentation 32, where the search results 24 might not be aggregated, but may be presented in separate portions, grouped by the search engine 18 that provided each search result 24, and/or by the type of item represented by or associated with each search result 24. A separate portion of the display may be allocated for each set of search results 24 in order to suggest the context or common source of each search result set 34. A first search result set 34 may be presented for the search results 24 presented by the local filesystem search engine, where each search result 24 represents a file that at least marginally matches the query 16. A second search result set 34 generated by the email search engine may be presented below the first search result set 34, and may include email messages identified as at least marginally matching the query 16. A third search result set 34 generated by the web search engine may be presented in yet another allocated portion of the display of the device 14, and may present search results 24 corresponding to the various web pages matching the query 16 (and may be sorted, e.g., by relevance scores.) While this organization of the search results 24 may occupy more space on the display of the device 14, the grouping suggests a commonality of source or data type among the search results 24 within a particular group.

While the exemplary presentations of FIG. 2 present a significant amount of information in a consistent format, problems exist in several aspects. First, while the number of results illustrated in these examples is limited, the number of results in an actual search of the web, an email mailbox, and a filesystem is likely to be large, and the search results 24 are likely to be extensive. This may lead to long lists of search results 24, which may be tedious to review on any device 14. In particular, it may be difficult to review search results 24 as presented as in FIG. 2 on a mobile device, which may have a small display, comparatively slow video operations, and a small amount of memory in which to hold copious search results 24. As a second example, the ordering of the search results 24 in both presentations is rather haphazard. In the first presentation 30, the search results 24, while sorted by relevance score, have no presentation flow; a web page about a first topic may be followed by an email about a second topic and a file relating to a third topic. In the second presentation 32, the presentation flow is marginally improved by grouping search results 24 according to the referenced object types. However, this grouping may be unhelpful to a user seeking all information about a particular topic or concept, and this grouping does not address the rapid flux of topics that may be covered (e.g., the search results 24 of the web search still vary significantly by topic.) If the user 12 is only seeking information about a particular topic, such as "Prof. Mark John at George Mason University in Washington, D.C." or "Tribute to George Washington by John Philip Sousa," the user 12 may have to wade through a great deal of information before finding such information. Moreover, the grouping of search results 24 in the second presentation 32 may actually detract from the ease of user browsing; e.g., the topical information about the assignment regarding the book about George Washington and John Adams is also partitioned into an email search result, a filesystem search result, and a web search result.

Based on these examples, it may be appreciated that the search results 24 cover many topics, but the query 16 does not include enough information for the device 14 to discern the particular topic of interest to the user 12. While it may be possible to ask the user 12 to narrow the search by entering additional information, this may lead to extensive data entry for the query 16 that may also become tedious (e.g., "project, U.S. History, Assignment #1, Prof. Mark John, book, *The First Presidents* . . . ") Alternatively, the search results 24 may be better organized based on topical grouping. It may be difficult for the device 14 to make very accurate logical associations among the disparate set of search results 24 (particularly on mobile devices with comparatively slow processors and limited memory.) However, it may be feasible to identify types of information presented in the search results, and to consolidate information on particular types of information into particular query domains. For example, among the search results 24 of FIG. 1, it may be possible to identify the names of well-known public figures (such as George Washington); the names and contact identifiers of contacts stored in a directory (such as Prof. Mark John and George J. Sands, both of which appear to be frequent contacts); and references to particular movies, music, and books (such as the film GW and the album Tribute to George Washington.) Additional query domains may be established for other concepts, such as places, events, and news topics of interest to the user 12, and search results 24 that relate to these query domains may be so identified. The search results 24 may then be grouped and presented according to the query domains, thereby improving the topical organization of the search results 24.

Figure 3:
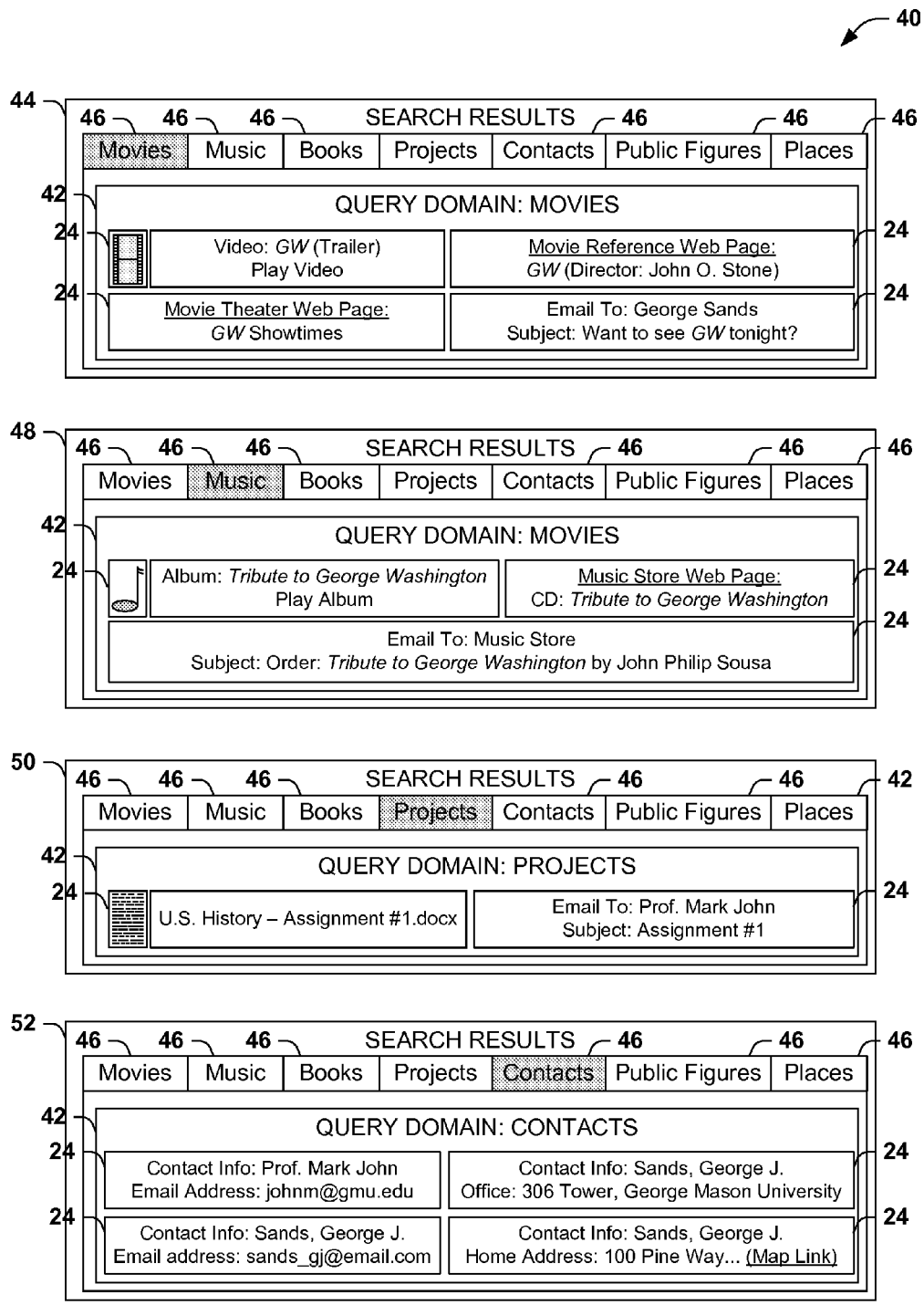
FIG. 3 is an illustration of an exemplary presentation of the search results of FIG. 1 in accordance with the techniques set forth herein.

FIG. 3 presents an exemplary presentation 40 of search results 24 organized according to the techniques discussed herein. In this exemplary presentation 40, a query domain set 46 is defined to include query domains 42 for Movies, Music, Books, Projects, Contacts, Public Figures, and Places. Each query domain 42 is associated with search results 24 that match the type of information represented thereby. This query domain set 46 might be predefined (e.g., as the set of topics whereby the user 12 wishes the search results 24 of all queries 16 to be filtered) or may be generated ad hoc for this particular query 16, based on the types of query domains 42 to which the search results 24 appear to relate. Moreover, the query domain set 46 is presented as a tabbed user interface, with one tab relating to each query domain 42, and a user selection of a tab presents only the query domain 42 associated with the selected tab and the search results 24 related thereto. For example, a first user selection 44 of the first tab ("Movies") may present all of the search results 24 relating to movies. In this example, a few of the search results 24 relate to the GW movie, so these search results 24 are presented together in the selected "Movies" query domain 42, including the locally stored file comprising a video trailer, two web pages relating to the film, and an email discussing the film. A third user selection 50 of the "Projects" tab presents a similar grouping of results relating to the "Projects" query domain 42, including the locally stored document embodying a class project and an email discussing this document (and possibly having the document attached.) A fourth user selection 52 limits the displayed search results 24 to the domain of "Contacts," including various forms of contact information featured in the entire body of search results 24, such as the email addresses and mailing addresses of the individuals listed in the search results 24. The grouping of search results 24 by query domain 42 may improve the topical presentation of information to the user 12, thereby facilitating the review and selection of a desired set of search results 24. Moreover, this organization of information might be comparatively easy to implement, comparatively efficient in the utilization of computational resources, and comparatively compact to display (compared with the extensive presentations of FIG. 2.) In particular, these features may be conducive to displaying the search results 24 on a mobile device having limited computational resources and a small display.

Figure 4:
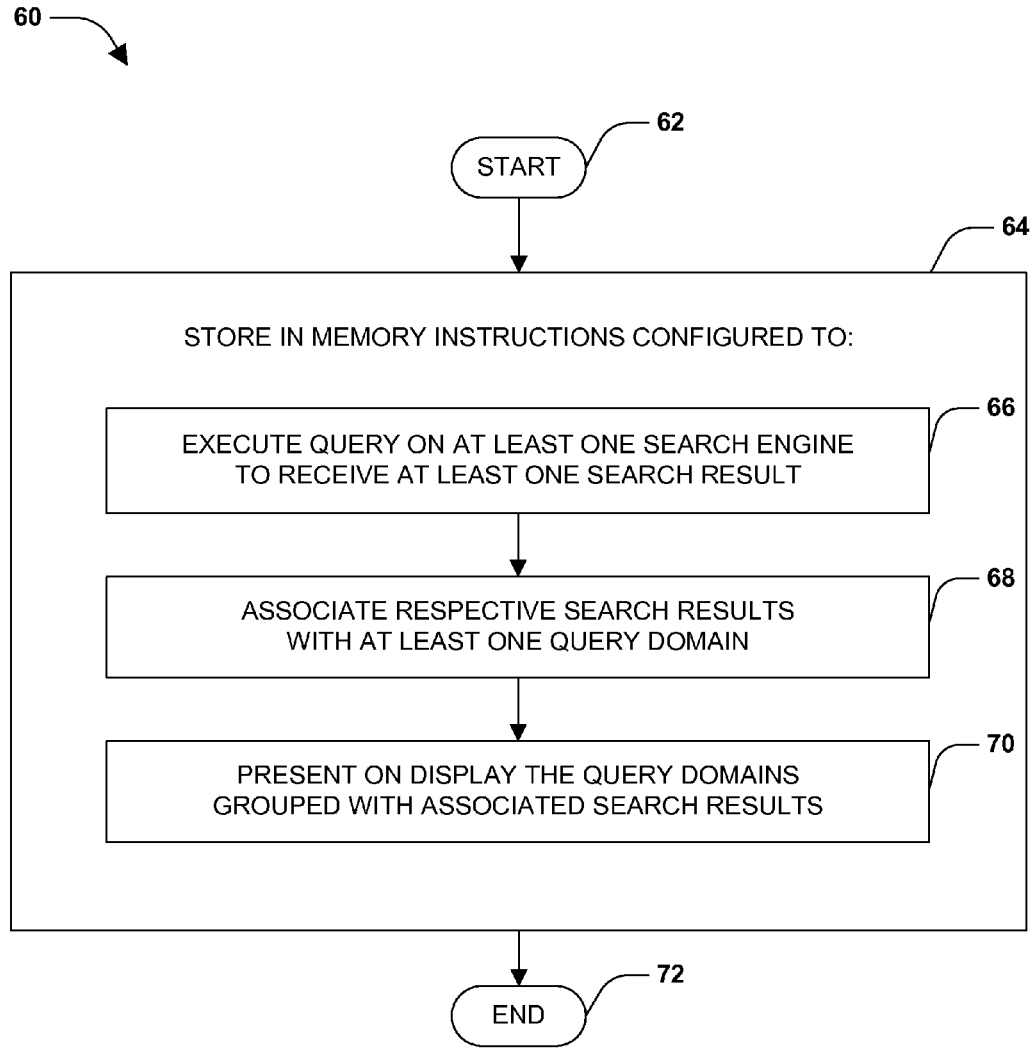
FIG. 4 is a flow chart illustrating an exemplary method of presenting search results in response to a query.

FIG. 4 presents a first embodiment of these techniques, illustrated as an exemplary method 60 of presenting search results 24 in response to a query 16 on behalf of a user 12 of a device 14 having a processor and a display. The exemplary method 60 begins at 62 and involves executing on the processor instructions configured to achieve the presentation of search results 24 according to query domains 42. In particular, the instructions are configured to execute 66 the query 16 on at least one search engine 18 to generate at least one search result 24; to associate 68 each search result 24 with at least one query domain 42; and to present 70 on the display the query domains 42 grouped with associated search results 24. By identifying the query domains 42 included in the search results 24 and by grouping the presentation of the search results 24 accordingly, the exemplary method 60 thereby achieves a topical presentation of the search results 24 to the user 12, and so ends at 72.

Figure 5:
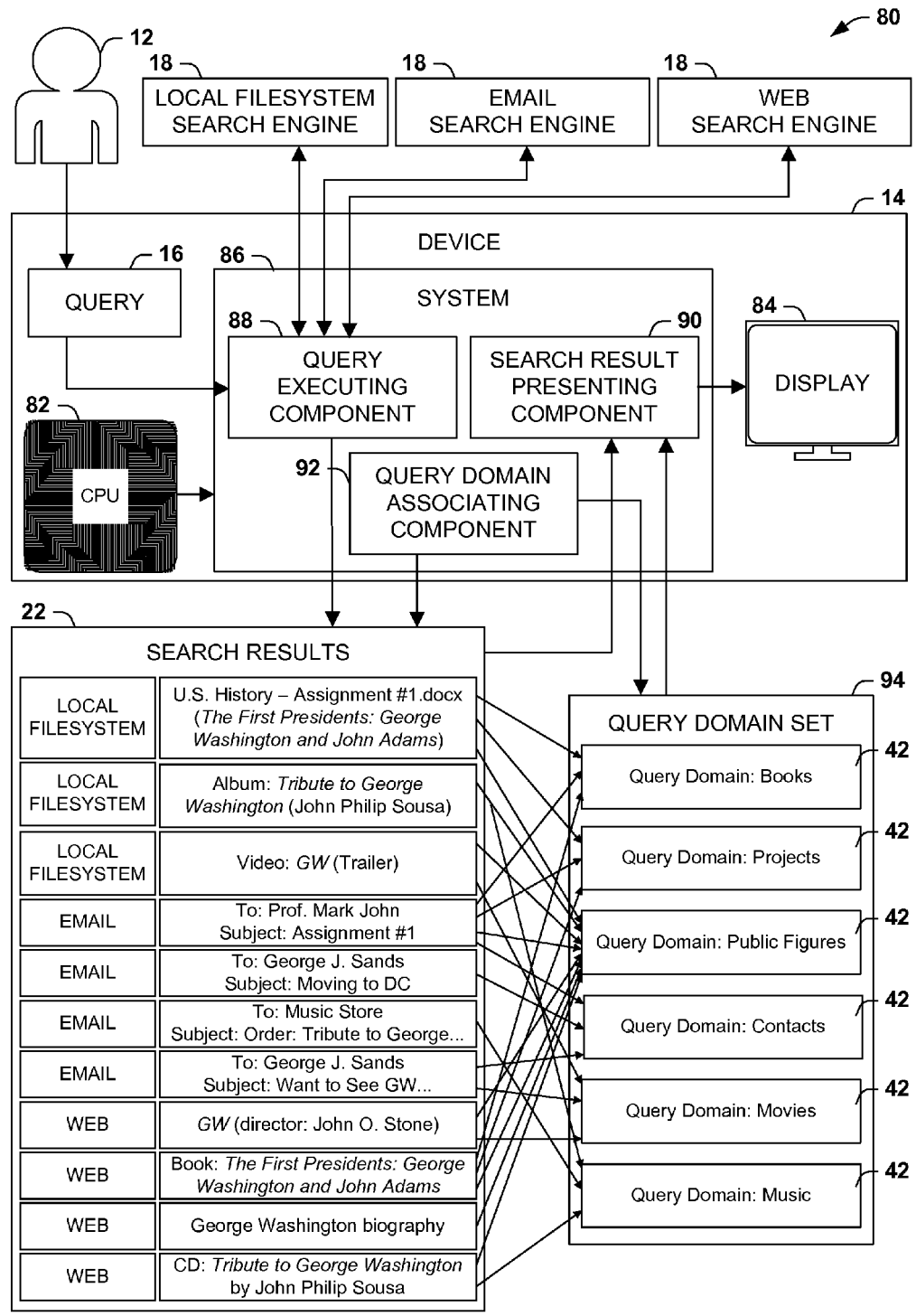
FIG. 5 is a component block diagram illustrating an exemplary system for presenting search results in response to a query.

FIG. 5 presents an exemplary scenario 80 featuring a second embodiment of these techniques, illustrated as an exemplary system 86 operating within a device 14. The system 86 may be implemented, e.g., as a software architecture comprising instructions executed by a processor 82 of the device 14. This device 14 is operated by a user 12 who inputs a query 16 to be executed on a plurality of search engines 18, and comprises a display 84 where the search results 24 of the query 16 are to be rendered. The exemplary system 86 comprises a query executing component 88, which is configured to execute the query 16 on at least one search engine 18 to generate at least one search result 24. The search result set 22 obtained by the query executing component 88 may then be processed by a query domain associating component 90, which may be configured to associate respective search results 24 with at least one query domain 42, such as within the query domain set 94. For example, the query domain associating component 90 may receive the first search result 24 in the search result set 24 (the reference to the locally stored file comprising the book report), and may identify the search result 24 as relating to a book (*The First Presidents*), to a project (as an assignment in the U.S. History class), and to a public figure (George Washington.) The query domain associating component 90 may therefore map this search result 24 to the "Books" query domain 42, the "Projects" query domain 42, and the "Public Figures" query domain 42. The rest of the search results 24 in the search result set 22 may be similarly evaluated and associated with query domains 42. The resulting associations may be received by a search result presenting component 92, which may be configured to present, on the display 84, the query domains 42 grouped with associated search results 24. The grouping may involve a tabbed user interface, such as illustrated in FIG. 3, or another grouping mechanism, such as pages in a page set, nodes in a tree view, or simply a logical grouping of items within a list. By achieving the grouped presentation of the search results 24, the exemplary system 86 promotes the review and selection by the user of the desired subset of search results 24 among the large search result set 22.

Figure 6:
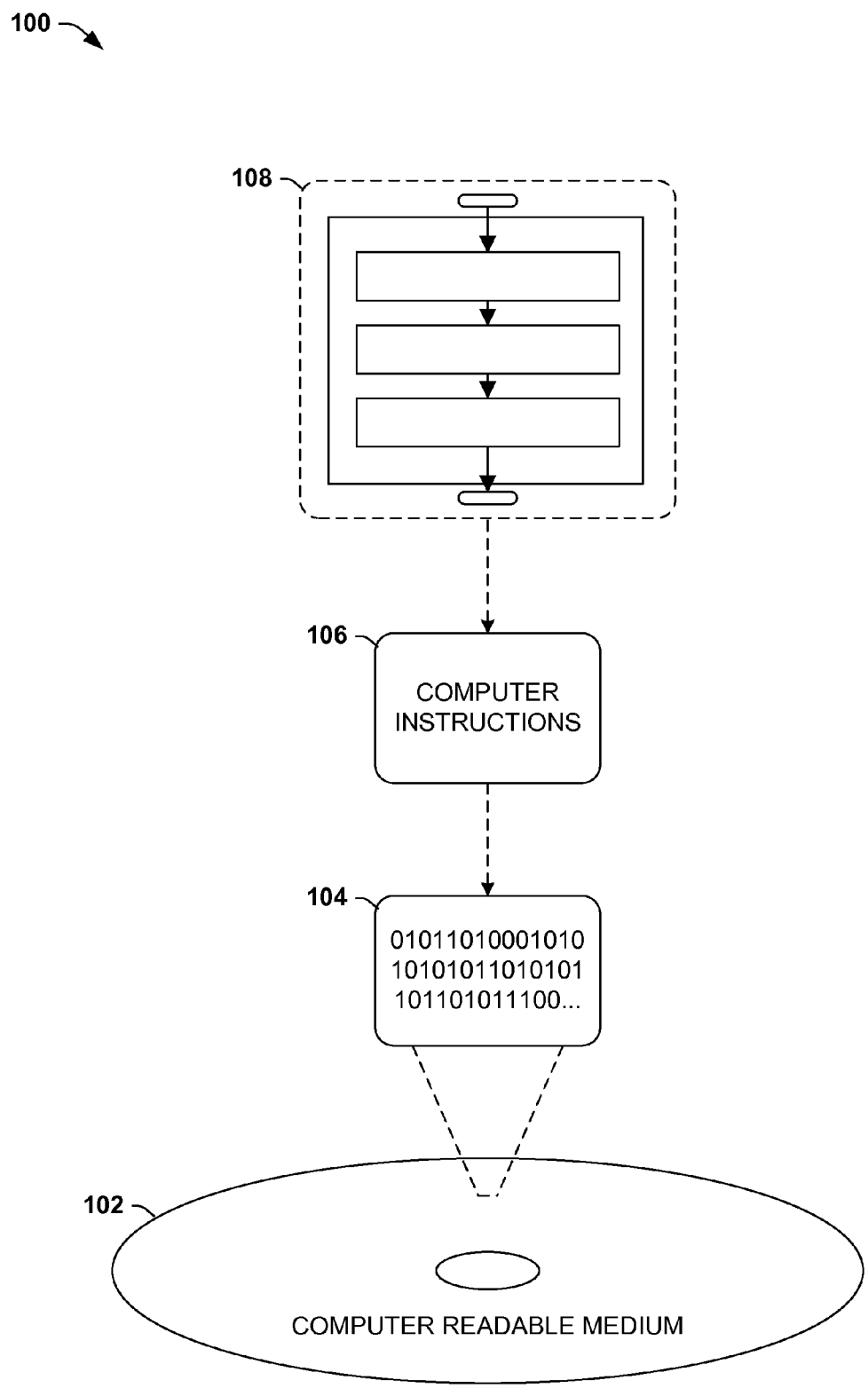
FIG. 6 is an illustration of an exemplary computer-readable medium comprising processor-executable instructions configured to embody one or more of the provisions set forth herein.

Still another embodiment involves a computer-readable medium comprising processor-executable instructions configured to apply the techniques presented herein. An exemplary computer-readable medium that may be devised in these ways is illustrated in FIG. 6, wherein the implementation 100 comprises a computer-readable medium 102 (e.g., a CD-R, DVD-R, or a platter of a hard disk drive), on which is encoded computer-readable data 104. This computer-readable data 104 in turn comprises a set of computer instructions 106 configured to operate according to the principles set forth herein. In one such embodiment, the processor-executable instructions 106 may be configured to perform a method of presenting search results in response to a query, such as the exemplary method 60 of FIG. 4. In another such embodiment, the processor-executable instructions 106 may be configured to implement a system for presenting search results in response to a query, such as the exemplary system 86 of FIG. 5. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 60 of FIG. 4 and the exemplary system 86 of FIG. 5) to confer individual and/or synergistic advantages upon such embodiments.

A first aspect that may vary among embodiments of these techniques relates to the origin of the query 16. In some embodiments, the query 16 may be provided to the query executing component 88, e.g., by a data-driven application executed on behalf of the user 12, and the embodiment of these techniques may be formulated as an application programming interface (API) that receives, processes, and presents the results of queries received in any manner. However, other embodiments of these techniques may be configured to receive the query 16 from the user 12 in various ways. For example, the device 14 may comprise at least one input component, such as a microphone, a keyboard, a pointing device, or a camera, and the embodiment may be configured to receive the query through the at least one input component. Therefore, many variations of this first aspect may involve an input domain that may facilitate the receiving of the query 16.

As a first variation of this first aspect, the query 16 may be received in many ways. As a first example, the input component may be associated with an input control that is configured to receive the query 16 through the input component. For example, these techniques may be associated with a particular visual control that might be available for inclusion in many applications, where activating the visual control (e.g., clicking on a button or selecting a textbox with a pointing device) initiates the receiving of the query 16 through the associated input component and the application of these techniques thereto. Moreover, this input component might be included in many aspects of the device, such as within the computing environment (e.g., the desktop, the applications menu, or the taskbar) of the device. As a second example, the device might include a hardware feature associated with the embodiment, such as a button that initiates the receiving of the query.

As a second variation of this first aspect, the input domain may include many features that specifically relate the query 16 to the type of input device through which the query was received. As a first example, the input domain may include input facilitation techniques that are particular to the input component, e.g., auto-completion for text input and voice-activated menus prompts for voice input. As a second example, the input domain may include contextual and parsing rules that are particular to queries submitted via the input component. For example, queries received via voice or T9 input may be indicative of queries submitted via mobile devices, which may be more commonly constrained to particular tasks, such as mapping and directions, identifying locations of interest, and contacting individuals in a directory. Voice and T9 queries might first be classified within an input domain that is specific to these types of queries, and a general-purpose parser might be applied if the more specific parser fails to parse the query.

As a third variation of this first aspect, respective input components may be associated with an input grammar, and the instructions might be configured to normalize the query 16 according to the input grammar associated with the input component through which the query 16 was received. For example, a first grammar associated with a text input device might be configured for normalizing text queries, such as detecting key transposition and correcting typographical errors. A second grammar associated with a microphone input device might be configured for normalizing voice queries, such as the informalities and ambiguities of speech (e.g., the clarification of homonyms.)

The input domains and grammars associated with various input components may be developed and configured in many ways. In some variations of this aspect, the grammar might be based on many concepts in human/computing interfaces and linguistics, such as predicting and parsing text input via a trigram or other n-gram language model. For example, the grammar might attempt to correlate particular query terms with common query terms within the input domain. This correlation may be achieved by representing the grammar as a query term normalization database that stores common query terms. The query 16 may be parsed or normalized according to the grammar by iteratively correlating the terms of the query 16 with common query terms within the input domain, i.e., by identifying common query terms that approximate the query term in the query 16, and upon finding a suitable match, replacing the query term in the query 16 with the common query term. This may be helpful, e.g., for parsing the terms of a voice query with query terms that are often included in voice queries.

Figure 7:
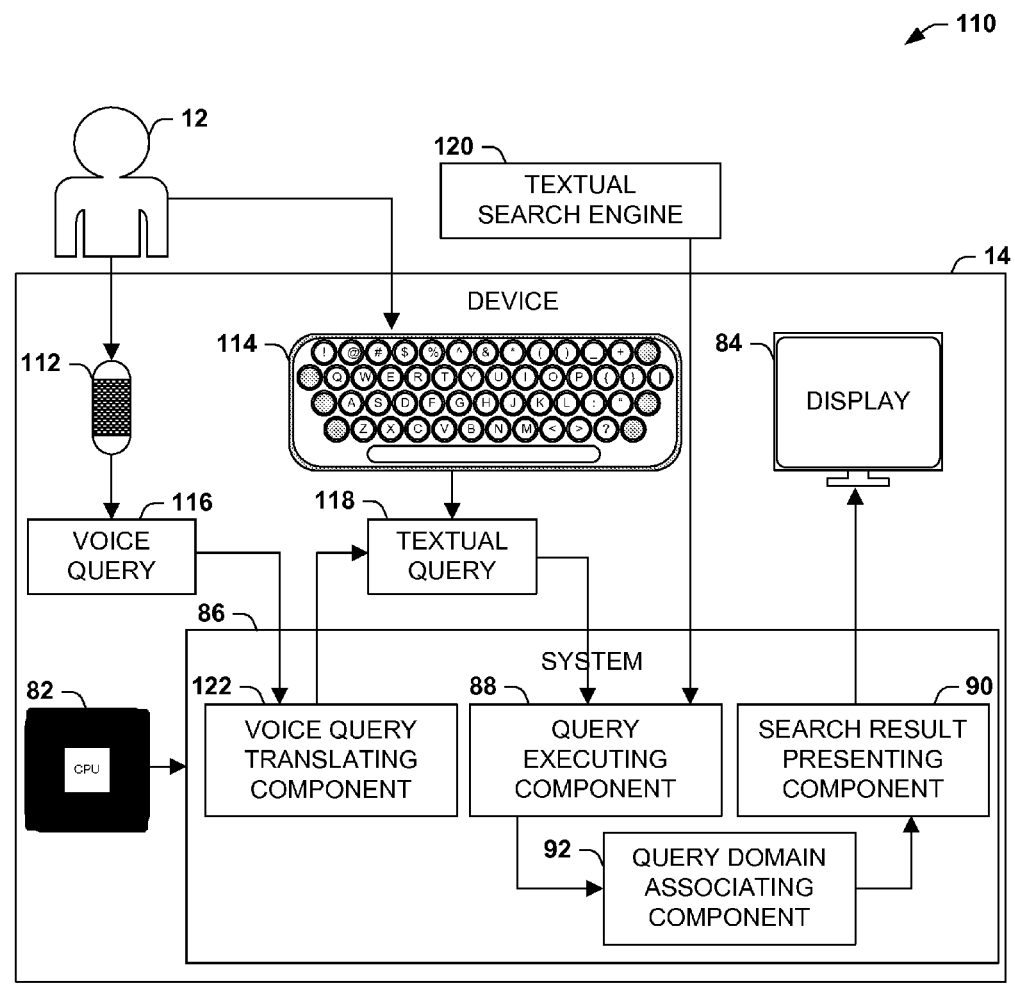
FIG. 7 is a component block diagram illustrating another exemplary system for presenting search results in response to a query.

In one such embodiment, a query 16 received in a first input domain (e.g., through a first input component) might be translated to a second input domain before executing the query 16 against the search engines 18. For example, a voice query received through an audio input component (such as a microphone) might be recognized into text before executing the query 16 on at least one search engine that comprises a textual search engine, i.e., that is configured to handle textual queries. FIG. 7 illustrates an exemplary scenario 110 utilizing such a technique, featuring a device 14 that comprises an audio input component 112 (e.g., a microphone), a text input component 114 (e.g., a keyboard), and an exemplary system 86 configured to receive and handle queries from both input components in a consistent manner. In this exemplary scenario 110, the audio input component 112 may be activated to receive a voice query 116, while the text input component 114 may be activated to receive a textual query 118. However, the search engine 18 against which the query is to be executed may comprise a textual search engine 120 that is configured to receive only textual queries 118. Therefore, the exemplary system 86 may include a voice query translating component 122, which may be configured to receive a voice query 116 and to recognize it into a textual query 118. The textual query 118 (whether received through the text input component 114 or from the query translating component 122) may then be delivered to the query executing component 88 for further processing.

Figure 8:
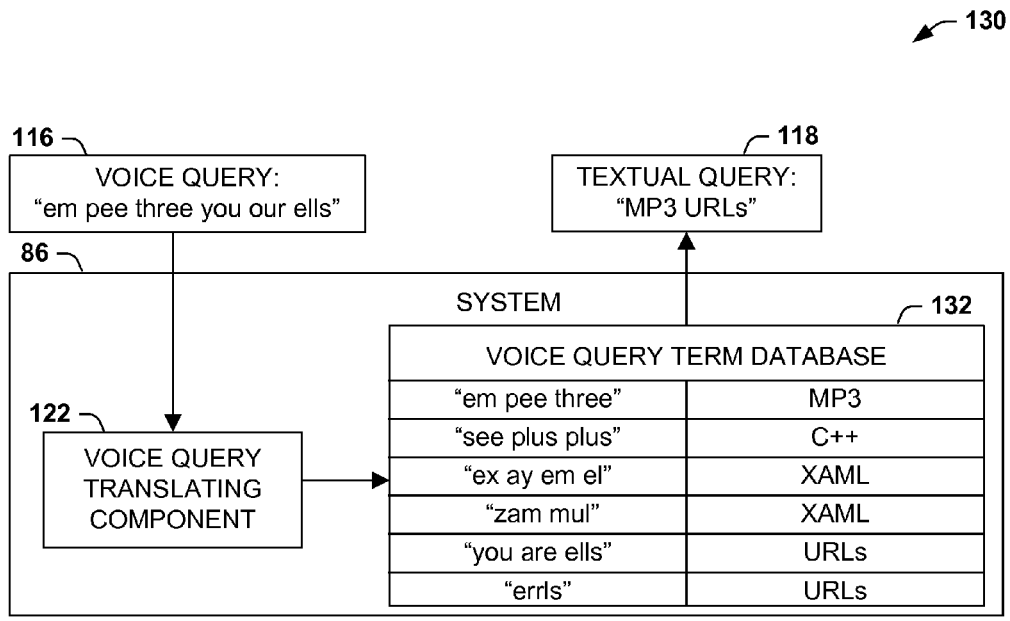
FIG. 8 is an illustration of a translation of a query in a first input domain to a query in a second input domain.

Within a query domain 42, additional processing may occur to improve the reception of a query 16 and the processing thereof. FIG. 8 illustrates a first exemplary scenario 130 featuring a portion of an embodiment of these techniques, again represented as an exemplary system 86 for presenting search results in response to a query 16. This embodiment may be configured to receive a voice query 116, but some terms in the voice query 116 may be difficult to identify due to pronunciation variations. Accordingly, a voice query term database 132 might include a range of pronunciations of such terms, and might correlate such variably pronounced query terms with a common query term representing the associated technologies. The exemplary system 86 may include such a voice query term database 132, which may be used to correlate spoken terms in a voice query 116 with accepted textual terms in a textual query 118 to be submitted to a textual search engine 120. The voice query translating component 122 may therefore translate the voice query 116 into the textual query 118 by identifying voice query terms in the voice query term database 132, and by translating such voice query terms into the common textual query terms so identified. As a first example, difficult technical terms may be correlated to accepted spellings thereof; e.g., the spoken syllables "see plus plus" might be translated to the textual query term "C++", while the spoke syllables "ex ay em el" or "zam mul" might be translated to the textual query term "XAML." As a second example, an accepted or standard capitalization may be attributed to a textual query term that may not otherwise be discernible from the voice query 116; e.g., "you are ells" might be translated as the textual query term "URLs." The voice query translating component 122 might therefore refer to the voice query term database 132 to select textual query terms that correspond to various terms of the voice query 116 while generating the textual query 118. Moreover, the matching might be approximate, e.g., to allow for variations in accent or pronunciation. As illustrated in FIG. 8, in translating a voice query for "emp pee three you our ells," the voice query translating component 122 might first match and select the term "MP3", and then might approximately match the remaining syllables with the recorded pronunciation "you are ells," thereby selecting the accepted capitalization "URLs." The exemplary system 86 thereby promotes the translation of queries 16 among input domains prior to execution on one or more search engines 18.

Figure 9:
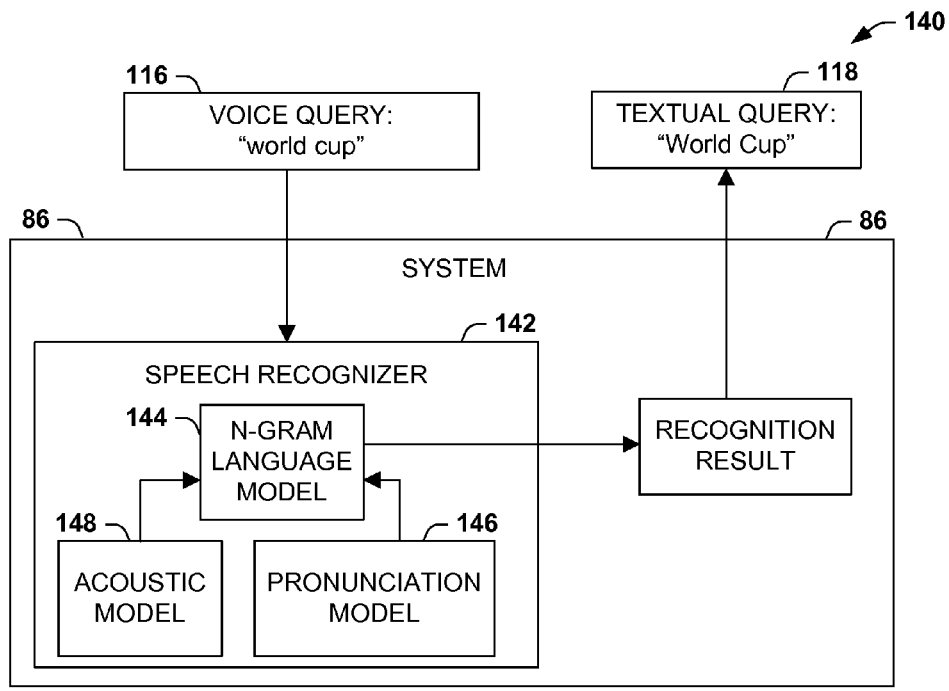
FIG. 9 is an illustration of a recognition of a query in a first input domain to a query in a second input domain.

Alternatively or additionally, the processing of a query 16 may be facilitated by a parsing of the query 16 according to a language model specific to the query domain 42 of the query 16. For example, a language model may be devised to process a voice query 116 according to the language that is typically used by a user 12 while speaking the query 116. FIG. 9 illustrates an exemplary scenario 140 featuring a reception of a voice query 116 according to a speech recognizer 142. The speech recognizer 142 may comprise an n-gram language model 144, such as a trigram language model configured to identify query terms based on a vocabulary of common three-term sequences within the language model. This n-gram language model 146 may be trained to recognize query terms of voice queries 116, e.g., using a set of spoken queries with matching textual queries 118 as a training set, and may then be utilized to identify the query terms of the voice query 116 according to the vocabulary of the language model. The speech recognizer 142 may also comprise a pronunciation model 146, which may comprise representations of the pronunciation of various query terms of voice queries 116. The speech recognizer 142 may also comprise an acoustic model 148, which identifies phonemes from the acoustic input comprising the voice query 116. The phonemes identified by the acoustic model 148 may then be matched with individual query terms according to the pronunciation model 146, and parsed into a set of statistically likely query terms according to the n-gram language model 144. The speech recognizer 142 may therefore produce a recognition result that may be provided as output comprising a textual query 118. This embodiment may have several advantages. As a first example, the language model may permit an improved recognition of the voice query 116, such as a more accurate reception of query terms. As a second example, the language model may be developed in view of various properties of the query domain 42; e.g., a correct capitalization of query terms may be difficult to identify in a voice query 116, so the capitalization may be factored into the n-gram language model 144 to identify the proper capitalization of common query terms as part of the vocabulary of the language model.

As a fourth variation of this first aspect, a translated or recognized query produced while transitioning a query 16 from a first input domain to a second input domain might not be reliably accurate to a sufficient degree. For example, a voice query 116 translated to a textual query 118 might not be fully accurate. Therefore, as an additional refinement of this technique, an embodiment of these techniques might be configured to confirm the translated query with the user 12 after transitioning the query 16 and before executing the transitioned query on the search engines. (e.g., "Received query: MP3 URLs—is this correct?") If the user 12 confirms the transitioned query, the transitioned query may be executed on the search engines 18; but if the user 12 does not confirm the transitioned query, an alternative parsing of the query 16 may be offered, and/or the user may be permitted to input the query 16 again. Those of ordinary skill in the art may devise many improvements of various embodiments that relate to the receiving and normalization of queries while implementing the techniques discussed herein.

A second aspect that may vary among embodiments of these techniques relates to the search engines 18 against which the query 16 may be executed. As a first example, various search engines 18 might be configured to cover various data sources, such as a web search engine configured to search web pages on the internet or on a particular network, a file search engine configured to search among files stored on a local or network filesystem, a local object search engine configured to search objects stored locally on the device (e.g., in an object database such as CORBA), or a database search engine configured to search among records in a database. As a second example, various search engines 18 might be configured to accept queries 16 of different forms, such as a natural language query, a keyword query, a mathematical query, or a query written in a programming language, such as SQL or LINQ. As a third example, various search engines 18 may support different types of logical constructs, such as field-based limitations, Boolean logic, or programming logic (such as mobile agents or lambda functions.) Many types of queries 16 may be executed on various types of search engines 18 while implementing the techniques discussed herein.

A third aspect that may vary among embodiments of these techniques relates to the manner of associating respective search results 24 with query domains 42. As a first variation, the query domain set 94 may be predefined, e.g., as an index of query domains 42 representing general categories with which the search results 24 of any query 16 may be associated. As a second example, the query domain set 94 may be generated in an ad hoc manner, i.e., by evaluating a search result 24, identifying the types of content featured therein, associating the search result 24 with one or more existing query domains 42, and/or creating a new query domain 42 representing a new type of information that is not covered by the other query domains 42 in the query domain set 94.

As a second variation, some search engines 18 may identify semantic information regarding topics included in each such search result 24. According to concepts such as the "semantic web" and the "semantic desktop," various forms of content might include metadata that identifies the semantics involved in such content; e.g., a piece of contact information (such as an email address, a mailing address, or a telephone number, or an alias used on a messaging service) might be so identified in metadata, while names (such as "George Washington") might be identified as a public figure. The query domains 94 might be aligned with such semantic metadata, and the association of a search result 24 with a query domain 42 might involve a reading of this metadata and a matching to the corresponding query domain 42.

As a third variation, a query domain 42 might be associated with search results 24 identifiable by at least one distinctive characteristic. In one set of embodiments, the query domains 42 might be defined for general types of search results 24, such as "Contacts," "Public Figures," "Projects," "Movies," etc. All search results 24 identified as relating to these types of topics may be associated with the corresponding query domains 42. As a first example, a search result 24 involving contact information for a contact might be identifiable according to a regularly structured email address, such as a name, e.g., any combination of two or more words with capitalized first letters, with a piece of contact information such as an email address, e.g., [alphanumeric characters]@*.[domain].[top-level domain], or a national telephone number, e.g., (###) ###-####. These characteristics may therefore be represented and/or identified, e.g., through the use of defined regular expressions, heuristics, machine-learning classifiers, or other pattern-matching techniques. As a second example, the distinctive characteristic may comprise a name that matches (within an acceptable degree of approximation) against a database of names of well-known public figures, and a search result 24 may be presumed to relate to the "Public Figures" query domain 42 if an identified name is used in a significant capacity (e.g., mentioned in the title of the search result 42, or mentioned prominently in the associated content.) As a third example, a natural language parser might be utilized to evaluate the topical contents (as the distinctive characteristics) of a search result 24, and to select a query domain 42 with which the search result 24 may be associated. As a fourth example, a statistical query classifier can be utilized to evaluate the domain of the query, e.g., by training the statistical classifier (such as a neural network or a Bayesian classification function) to identify the query domain of search results having distinctive characteristics. The classifier can be trained on user click data, i.e., queries along with the clicked URLs; the domain of a query can be determined by identifying the domain of the URL clicked by the user. By leveraging a large amount of such data, a statistical classifier can be trained to predict the domain of future user queries at runtime.

Figure 10:
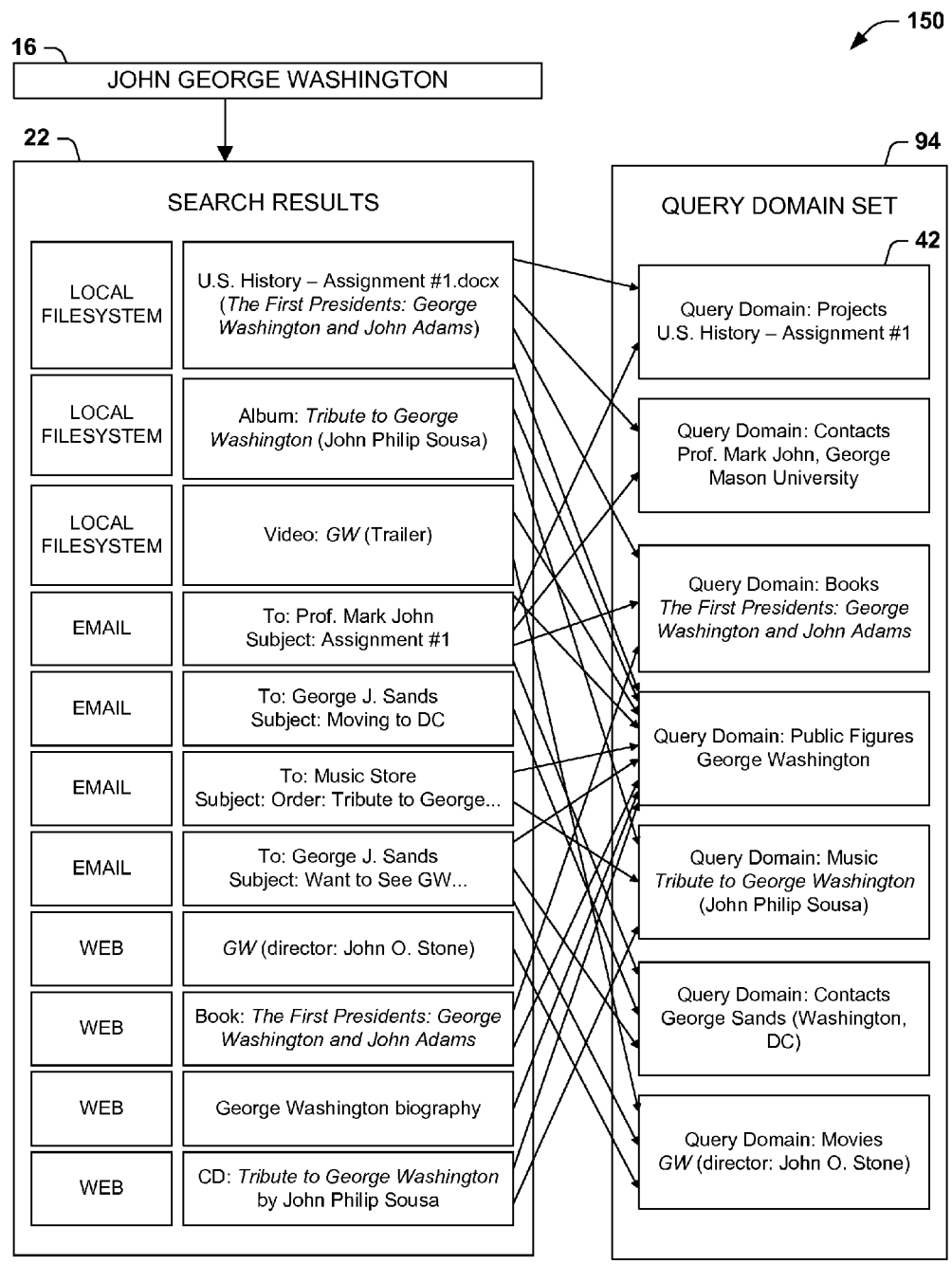
FIG. 10 is an illustration of an exemplary association of a search results set with a query domain set.

As a fourth variation, in addition to associating search results 24 with query domains 42 representing broad categories of similar information, the search results 24 may also be grouped according to particular topics within the query domains 42 that satisfy the query 16. FIG. 10 illustrates a first exemplary scenario 150 of these techniques, involving the search results set 22 generated for the query 16 "John George Washington." Instead of associating search results 24 with query domains 42 matching general types of information that may be covered by such search results 24, particular topics may be identified within the content of such search results 24 that satisfy the query 16 "John George Washington." For any such identified topics, the search result 24 may be associated with a query domain 42, as well as a particular topic within the query domain 42. For example, the first search result 24, relating to the U.S. History assignment, may be associated with a first query domain 42 and a representation therein of this particular assignment as a "Project"; a second query domain 42 (of a "Contact" type) and a representation therein of the professor who assigned the project; a third query domain 42 (of a "Books" type) and a representation therein of a book involved in the assignment; and a fourth query domain 42 (of a "Public Figure" type) and a representation therein of the individual, George Washington, who is discussed in the document. It may be appreciated that all four of the topics represented within query domains 42 satisfy the query 16 to at least a minimum extent (e.g., a project entitled "George Washington and John Adams"; a book bearing these same names; an individual named Prof. Mark John at George Mason University in Washington, D.C.; and the well-known public figure George Washington.) Additional search results 24 may be similarly associated with these and other query domains 42 and topics therein that satisfy the query 16.

Figure 11:
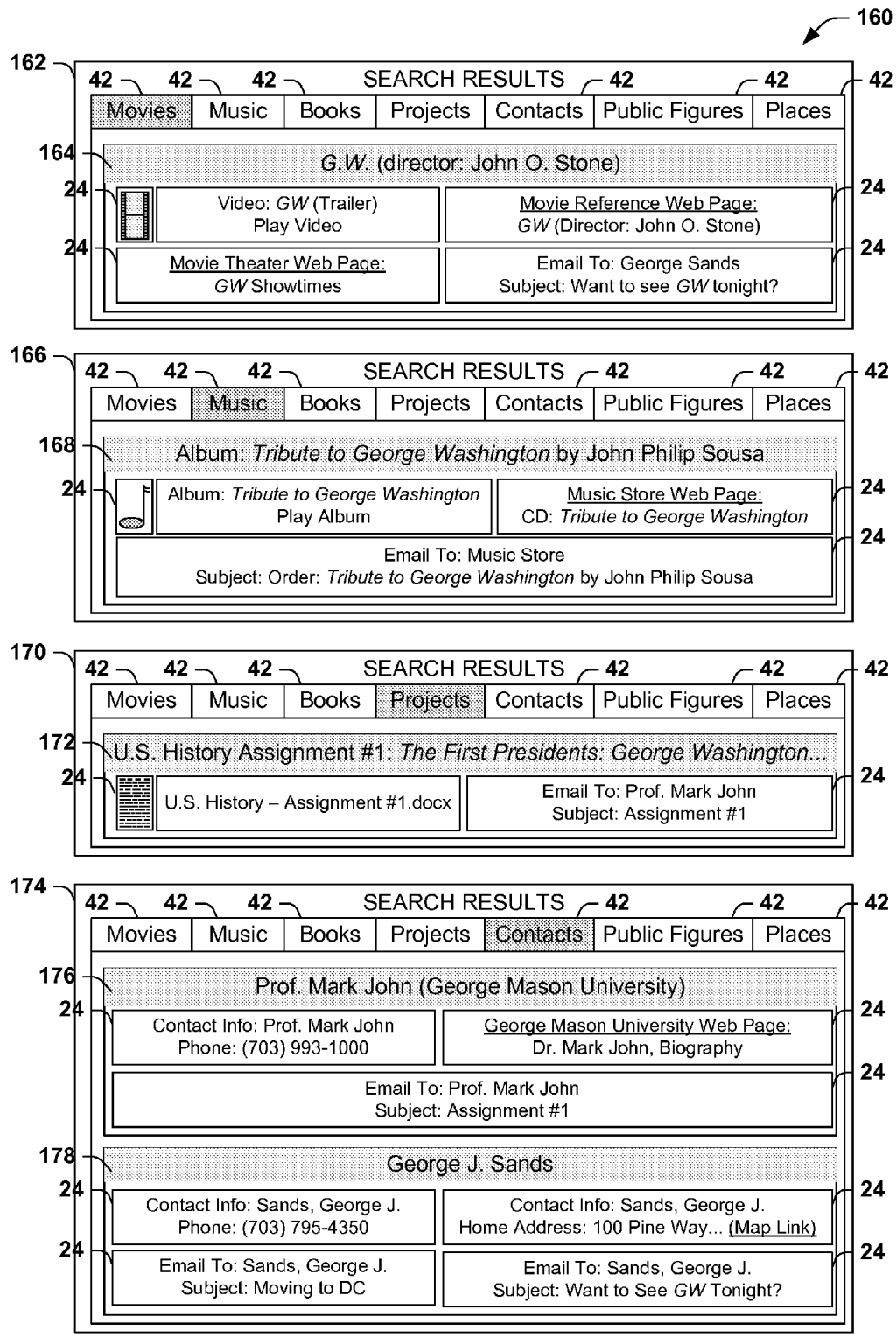
FIG. 11 is an illustration of an exemplary presentation of query domains and associated search results identified in FIG. 10.

While such topical identification and association of respective search results 24 may consume more computing resources, this association may provide advantages in the presentation of the search results set 22. FIG. 11 illustrates an exemplary scenario 160 illustrating search results 24 associated with the query domains 42 as illustrated in FIG. 10, where the search results are grouped first by query domains 42, and second by a topic represented within the query domain. In the first presentation 162 of FIG. 11, when the "Movies" query domain 42 is selected, the search results 24 may be displayed not only as items grouped with this query domain 42, but more particularly grouped around the particular topic that satisfied the query 16 within this query domain 42 (i.e., the GW movie.) Similarly, in the fourth presentation 174, the selection of the "Contacts" query domain 42 presents the first topic 176 identified therein that matches the query 16 (the professor named Mark John at George Mason University in Washington, D.C.) and the second topic 178 identified therein that matches the query 16 (the individual named George Jonathan Sands, a resident of Washington, D.C.) In contrast with the fourth user selection 52 illustrated in FIG. 3, the search results 24 may be grouped not only by this query domain 42, but also by the related topics within this query domain 42, resulting in a more focused organization of the search results 24. Moreover, this second level of organization may be achieved without significantly expanding the size of the displayed search results 24 or impacting the implementation of this technique on mobile devices with limited computing resources. Those of ordinary skill in the art may devise many techniques for associating search results with query domains while implementing the techniques discussed herein.

A fourth aspect that may vary among embodiments of these techniques relates to the presenting of the search results. While FIGS. 3 and 10 illustrate two alternative presentations of search results 24 grouped according to query domains 42, many such embodiments may be compatible with the techniques discussed herein.

As a first variation of this fourth aspect, presenting the search results 24 on the display 84 may involve a grouped interface, comprising groups allocated to respective query domains 42 and presenting a name of the query domain 42. Upon receiving a user selection of a group, the device may display the query domain 42 associated with the selected group, and the search results 24 associated with the query domain 42. One such embodiment involves a tabbed user interface, such as the tabbed user interface illustrated in FIGS. 3 and 10, where the names of the query domains 42 may be displayed in a horizontal or vertical row of tabs, and where the selection of a tab presents to the user 12 the query domain 42 of the same name, and the search results 24 associated with the selected query domain 42. However, other types of grouped user interfaces may similarly present the query domains 42 and associated search results 24 (e.g., a tree view interface, a breadcrumb-based hierarchical interface, or a set of pages in a page set.

As a second variation of this fourth aspect, the groupings of query domains 42, and the search results 24 presented therein, may be modified in various ways to improve the presented information. As a first example (as illustrated in FIG. 11), the presenting may involve identifying at least two search results 24 associated with a query domain 42 that are associated with a topic, and presenting the at least two search results 24 grouped together within the query domain 42. As a second example, various types of sorting, ordering, or filtering may be applied to the query domains 42 and/or the search results 24 associated therewith. For example, respective search results 24 may have a relevance score indicating the magnitude of the correlation of the search result 24 with the query 16. This relevance score may be specified by the search engine 18 and/or may be computed by the device 14, and may be measured in many ways (e.g., as a percentage approximating the degree of correlation, or as a ranking of the strength of the correlation in comparison with other search results 24 for the same query 16.) In a first such embodiment, the search results 24 associated with a particular query domain 42 may be presented while sorted in descending order by relevance score. In a second such embodiment, a minimally sufficient relevance score may be selected, such that respective search results 24 may only be presented within a query domain 42 if the relevance score thereof satisfies the minimally sufficient relevance score. This embodiment may therefore filter out query results 24 of low relevance, thereby improving the general relevance of the search results set 22 presented to the user 12. In a third such embodiment, a query domain relevance may be defined, such that a query domains 42 is only displayed if the search results 24 contained therein satisfy the minimally sufficient relevance score (e.g., having a sum at least equaling the minimally sufficient relevance score), or if at least one search results 24 associated therewith satisfies the minimally sufficient relevance score. This embodiment may therefore filter out query domains 42 having too few search results 24, and/or having search results 24 that are too loosely correlated with the query 16. In a fourth such embodiment, a query domain relevance score may be computed for respective query domains 42, based on the relevance scores of the search results 24 associated therewith, and the query domains 42 may be presented while sorted in descending order according to the query domain relevance scores thereof. Those of ordinary skill in the art may devise many presentations of the query domains 42 and the associated search results 24 while implementing the techniques discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 12:
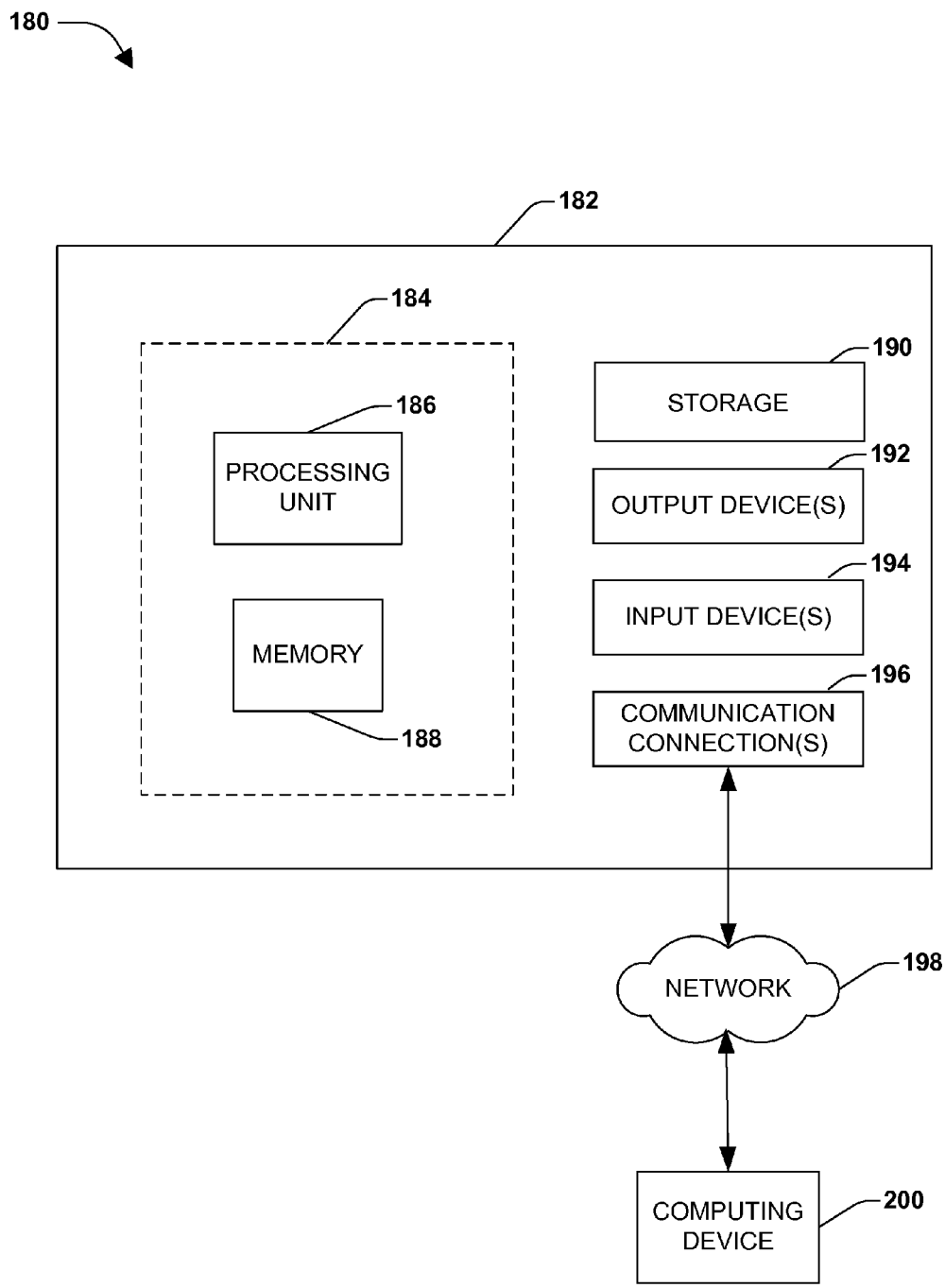
FIG. 12 illustrates an exemplary computing environment wherein one or more of the provisions set forth herein may be implemented.

FIG. 12 and the following discussion provide a brief, general description of a suitable computing environment to implement embodiments of one or more of the provisions set forth herein. The operating environment of FIG. 12 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 12 illustrates an example of a system 180 comprising a computing device 182 configured to implement one or more embodiments provided herein. In one configuration, computing device 182 includes at least one processing unit 186 and memory 188. Depending on the exact configuration and type of computing device, memory 188 may be volatile (such as RAM, for example), non-volatile (such as ROM, flash memory, etc., for example) or some combination of the two. This configuration is illustrated in FIG. 12 by dashed line 184.

In other embodiments, device 182 may include additional features and/or functionality. For example, device 182 may also include additional storage (e.g., removable and/or non-removable) including, but not limited to, magnetic storage, optical storage, and the like. Such additional storage is illustrated in FIG. 12 by storage 190. In one embodiment, computer readable instructions to implement one or more embodiments provided herein may be in storage 190. Storage 190 may also store other computer readable instructions to implement an operating system, an application program, and the like. Computer readable instructions may be loaded in memory 188 for execution by processing unit 186, for example.

The term "computer readable media" as used herein includes computer storage media. Computer storage media includes volatile and nonvolatile, removable and non-removable media implemented in any method or technology for storage of information such as computer readable instructions or other data. Memory 188 and storage 190 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 182. Any such computer storage media may be part of device 182.

Device 182 may also include communication connection(s) 196 that allows device 182 to communicate with other devices. Communication connection(s) 196 may include, but is not limited to, a modem, a Network Interface Card (NIC), an integrated network interface, a radio frequency transmitter/receiver, an infrared port, a USB connection, or other interfaces for connecting computing device 182 to other computing devices. Communication connection(s) 196 may include a wired connection or a wireless connection. Communication connection(s) 196 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 182 may include input device(s) 194 such as keyboard, mouse, pen, voice input device, touch input device, infrared cameras, video input devices, and/or any other input device. Output device(s) 192 such as one or more displays, speakers, printers, and/or any other output device may also be included in device 182. Input device(s) 194 and output device(s) 192 may be connected to device 182 via a wired connection, wireless connection, or any combination thereof. In one embodiment, an input device or an output device from another computing device may be used as input device(s) 194 or output device(s) 192 for computing device 182.

Components of computing device 182 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 182 may be interconnected by a network. For example, memory 188 may be comprised of multiple physical memory units located in different physical locations interconnected by a network.

Those skilled in the art will realize that storage devices utilized to store computer readable instructions may be distributed across a network. For example, a computing device 200 accessible via network 198 may store computer readable instructions to implement one or more embodiments provided herein. Computing device 182 may access computing device 200 and download a part or all of the computer readable instructions for execution. Alternatively, computing device 182 may download pieces of the computer readable instructions, as needed, or some instructions may be executed at computing device 182 and some at computing device 200.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description.

Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of presenting search results in response to a query on behalf of a user of a device having a processor and a display, the method comprising:
   executing on the processor instructions configured to:
      execute the query on at least one search engine to generate a plurality of search results;
      for respective search results generated by the at least one search engine:
         compute a search result relevance score for the search result;
         identify at least one topic semantically associated with the search result,
         identify a topic type of the at least one topic;
         identify at least one distinctive characteristic of the search result; and
         associating the search result with the identified topic type according to the at least one identified distinctive characteristic by evaluating the search result with a classifier configured to identify the topic types of a search result having the at least one distinctive characteristic;
      for respective topic types, compute a topic type relevance score of the topic type based on the relevance scores of the search results associated with the topic type; and
   present on the display:
      a plurality of topic type groups respectively representing a topic type and comprising a plurality of search results semantically associated with at least one topic of the topic type, the topic type groups sorted in descending order by the relevance scores of the search results within the topic type group, the groups comprising tabs in a tabbed user interface; and
      within respective topic type groups, the search results semantically associated with at least one topic of the topic type sorted in descending order by the search result relevance scores.

2. The method of claim 1:
   the device comprising at least one input component associated with an input domain, and
   the instructions configured to receive the query through at least one input component.

3. The method of claim 2, receiving the query comprising:
   presenting on the display an input control associated with an input component and configured to receive the query through the input component; and
   upon detecting a user activation of the input control, receiving the query through the input component associated with the input control.

4. The method of claim 2, the instructions configured to, after receiving the query and before executing the query on the at least one search engine, normalize the query.

5. The method of claim 4:
   at least one input component of the device associated with an input domain having an input grammar; and
   the instructions comprising: after receiving the query, normalizing the query according to an input grammar associated with the input component receiving the query.

6. The method of claim 4:
   the device comprising a query term normalization database storing at least one common query term; and
   normalizing the query comprising:
      identifying at least one common query term in the query term normalization database that approximates a query term of the textual query, and
      upon identifying the at least one query term, replacing the query term in the textual query with the common query term.

7. The method of claim 2:
   at least one input component of the device comprising an audio input component;
   the query comprising an audio query received through an audio input component;
   at least one search engine comprising a textual search engine configured to handle textual queries; and
   the instructions configured to, after receiving the query through the audio input component and before executing the query on the textual search engine, transitioning the audio query to a textual query.

8. The method of claim 7, transitioning the query comprising:
   identifying at least one phoneme in the query according to an acoustic model;
   identifying at least one query term corresponding to the at least one phoneme according to a pronunciation model; and generating a recognition result from the at least one query term according to a vocabulary of an n-gram language model.

9. The method of claim 7, the instructions configured to, after recognizing the audio query to a textual query and before executing the query on the textual search engine, confirm the textual query with the user.

10. The method of claim 1:
respective topic types associated with search results identifiable by at least one distinctive characteristic, and
associating the search results with topic types comprising:
identifying at least one distinctive characteristic of the search result, and
associating the search result with the at least one topic type according to the at least one identified distinctive characteristic.

11. The method of claim 10, associating the search result with a topic types comprising: evaluating the search result with a statistical classifier configured to identify the topic types of a search result having the at least one distinctive characteristic.

12. The method of claim 1, presenting the topic types comprising:
present on the display a grouped interface comprising groups allocated to respective topic types and presenting a name of the topic type; and
upon receiving a user selection of a topic type group, present on the display:
the topic type associated with the topic type group, and
the search results associated with the topic type.

13. The method of claim 12, the groups comprising tabs in a tabbed user interface.

14. The method of claim 1:
the instructions configured to identify at least two search results associated with a topic type that is associated with a topic, and
presenting the topic type groups comprising: presenting on the display the at least two search results grouped together within the topic type.

15. The method of claim 1:
the instructions defining a minimally sufficient relevance score; and
presenting the topic type groups comprising: presenting on the display the topic types grouped with associated search results having a relevance score at least equaling the minimally sufficient relevance score.

16. The method of claim 15:
presenting the topic type groups comprising: presenting on the display the topic type groups associated with at least one search result having a topic type relevance score at least equaling the minimally sufficient topic type relevance score.

17. A system configured to present search results in response to a query on behalf of a user of a device having a display and a memory, the system comprising:
a query executor comprising instructions stored in the memory that, when executed on the processor, cause the device to execute the query on at least one search engine to generate one a plurality of search results;
a topic type associator comprising instructions stored in the memory that, when executed on the processor, cause the device to, for respective search results generated by the at least one search engine:
compute a search result relevance score for the search result;
identify at least one topic semantically associated with the search result;
identify a topic type of the at least one topic;
identify at least one distinctive characteristic of the search result; and
associate the search result with the identified topic type according to the at least one identified distinctive characteristic by evaluating the search result with a classifier configured to identify the topic types of a search result having the at least one distinctive characteristic;
for respective topic types, compute a topic type relevance score of the topic type based on the relevance score of the search results associated with the topic type; and
a search result presenter comprising instructions stored in the memory that, when executed on the processor, cause the device to present on the display:
a plurality of topic type groups respectively representing a topic type and comprising a plurality of search results semantically associated with at least one topic of the topic type, the groups sorted in descending order by the relevance scores of the search results associated with the topic type group, the groups comprising tabs in a tabbed user interface; and
within respective topic type groups, the search results semantically associated with at least one topic of the topic type sorted in descending order by the search result relevance scores.

* * * * *